J. CUNNINGHAM.
Wheel-Cultivator.
No. 22,630.
Patented Jan. 18, 1859.
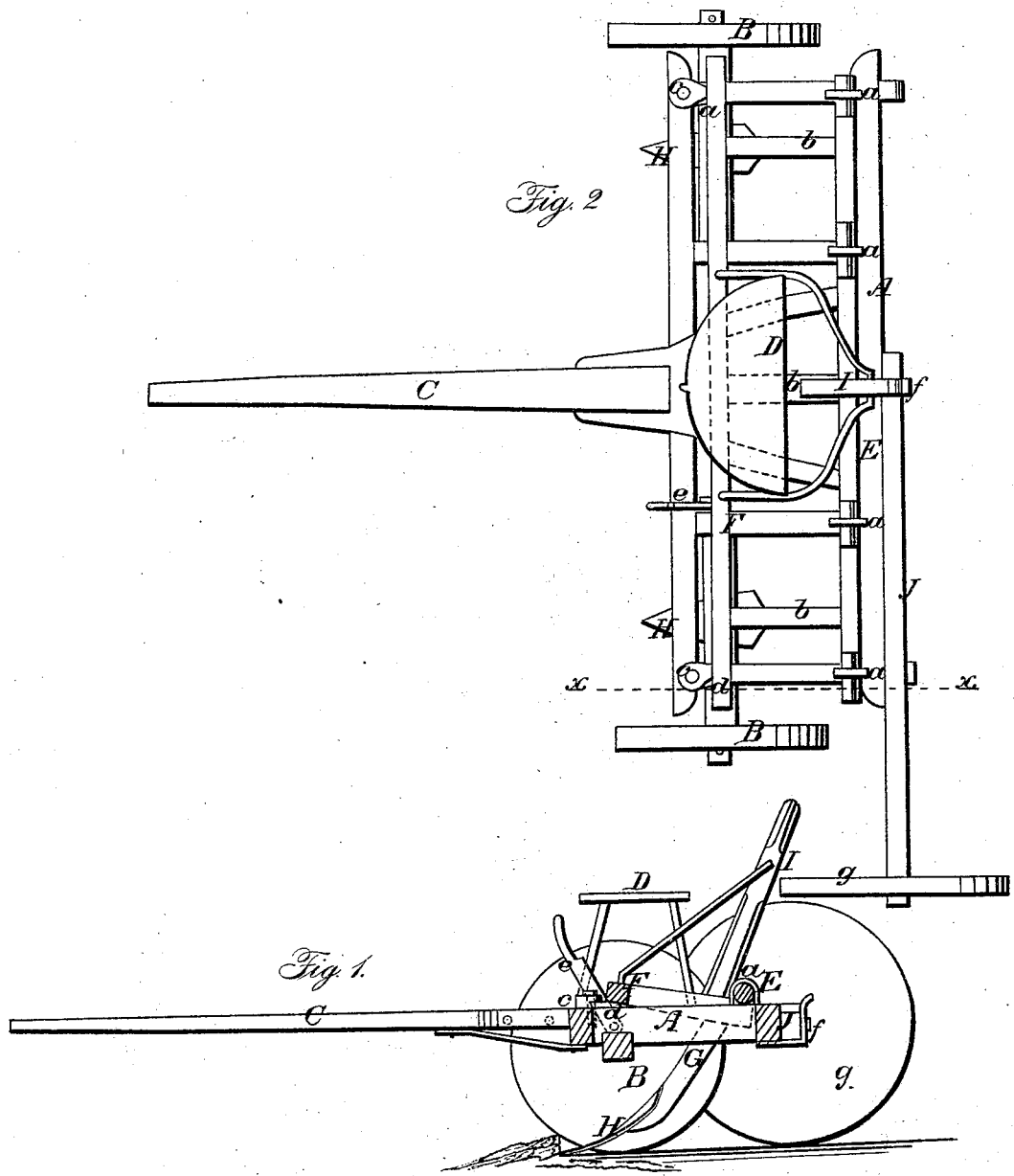
Inventor:
Jesse Cunningham

UNITED STATES PATENT OFFICE.

JESSE CUNNINGHAM, OF MARSHALL, MISSOURI.

IMPROVEMENT IN CULTIVATORS.

Specification forming part of Letters Patent No. 22,630, dated January 18, 1859.

*To all whom it may concern:*

Be it known that I, JESSE CUNNINGHAM, of Marshall, in the county of Saline and State of Missouri, have invented a new and Improved Furrowing-Machine for Furrowing Ground to Receive Seed; and I do hereby declare that the following is a full, clear, and exact description of the same, reference being had to the annexed drawings, making a part of this specification, in which—

Figure 1 is a side sectional view of my invention, taken in the line $x\,x$, Fig. 2. Fig. 2 is a plan or top view of the same.

Similar letters of reference indicate corresponding parts in the two figures.

This invention consists in a novel way of adjusting a frame to which furrow-shares are attached in order to regulate the depths of the furrows as occasion may require, the share-frame being fitted in a frame that is mounted on wheels and provided with a guide, as herein described.

To enable those skilled in the art to fully understand and construct my invention, I will proceed to describe it.

A represents a horizontal rectangular frame, which is mounted on wheels B B and has a draft-pole, C, attached to its front end, and a driver's seat, D, on its upper surface at or about its center.

To the back part of the frame A a shaft, E, is attached by loops or staples $a$, said shaft being allowed to turn in said loops or staples. To the shaft E arms $b$ are attached at right angles, and a bar, F, is attached to the front end of the arms $b$, said bar F being parallel with the shaft E, as shown clearly in Fig. 2.

To the arms $b$ inclined bars G are attached, one to each, and to each bar G a furrow-share, H, is secured, said shares being of the usual cultivator form, as shown clearly in Fig. 2.

On the front part of the frame A two buttons, $c\,c$, are attached, one at each side of the frame. These buttons are each provided with one or more step-like projections, $d$, as shown clearly in Fig. 1.

To the front part of the frame A a catch, $e$, is attached for retaining, when necessary, the bar F in an elevated position, so that the shares H will be free from the ground. A lever on handle I is attached to the shaft E, so that the furrow-shares may be raised by the driver with facility when required.

To the back part of the frame A a rod or bar, J, is attached by a pivot or bolt, $f$. This rod extends out some distance beyond the side of the machine, and may be turned or adjusted to either side of the machine. A wheel, $g$, is placed on the outer end of the rod or bar J, said wheel serving as a marker.

The several parts above described may all be of wood, with the exception of the furrow-shares, the staples or loops $a$, and the tires of the wheels B B.

The operation is as follows: As the machine is drawn along, the shares H furrow the ground, the catch $e$ being thrown outward, as shown in Fig. 1, and the shares being kept in the ground by the gravity of the shares and the frame to which they are attached. The depth of the furrows is regulated by the buttons $c\,c$, which, on account of their step-like projections $d$, form supports or rests of varying heights, and therefore allow the shares to penetrate the earth at a greater or less depth. The wheel $g$ leaves a mark denoting the path of the horse or team at the succeeding bout, and at the end of each row the bar J is turned on its pivot, so that the wheel $g$ will be at the side of the machine opposite to that where it was at the preceding bout.

I do not claim the reversible bar J with a marker or wheel, $g$, attached, for such device has been previously used; but,

Having thus described my invention, what I claim as new, and desire to secure by Letters Patent, is—

Attaching the furrow-shares H to a swinging frame formed of the shaft E, bar F, and arms $b$, placed in a mounted frame A, in combination with the buttons $c\,c$, provided with step-like projections $d$ for regulating or adjusting the height or inclination of said share-frame, and consequently the depth of the furrows, substantially as described.

JESSE CUNNINGHAM.

Witnesses:
JACOB H. FISHER,
JNO. R. HALL.